US009201384B2

(12) United States Patent
Yano et al.

(10) Patent No.: US 9,201,384 B2
(45) Date of Patent: Dec. 1, 2015

(54) CONNECTION MECHANISM AND IMAGE FORMING APPARATUS

(71) Applicant: FUJI XEROX CO., LTD., Tokyo (JP)

(72) Inventors: Kenichiro Yano, Kanagawa (JP); Keijiro Hamaba, Kanagawa (JP); Hirotake Eguchi, Kanagawa (JP); Akira Harada, Kanagawa (JP); Shohei Matsunami, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/306,622

(22) Filed: Jun. 17, 2014

(65) Prior Publication Data

US 2015/0098727 A1 Apr. 9, 2015

(30) Foreign Application Priority Data

Oct. 7, 2013 (JP) ................................ 2013-210370

(51) Int. Cl.

| | |
|---|---|
| ***G03G 15/00*** | (2006.01) |
| ***B25G 3/00*** | (2006.01) |
| ***F16B 7/14*** | (2006.01) |
| ***G03G 21/16*** | (2006.01) |

(52) U.S. Cl.

CPC ........ *G03G 21/1619* (2013.01); *G03G 21/1647* (2013.01)

(58) Field of Classification Search

CPC .......... G03G 21/1619; G03G 21/1642; G03G 21/1647

See application file for complete search history.

(56) References Cited

U.S. PATENT DOCUMENTS

| | | | | |
|---|---|---|---|---|
| 3,475,930 | A * | 11/1969 | Foote | 70/38 R |
| 4,087,142 | A * | 5/1978 | Aumack | 312/236 |
| 2006/0239771 | A1 * | 10/2006 | Hayashi et al. | 403/300 |

FOREIGN PATENT DOCUMENTS

| | | |
|---|---|---|
| JP | A-7-36242 | 2/1995 |

* cited by examiner

*Primary Examiner* — David Gray
*Assistant Examiner* — Michael Harrison
(74) *Attorney, Agent, or Firm* — Oliff PLC

(57) ABSTRACT

A connection mechanism includes a protrusion, a plate section, and a movable section. The protrusion has a distal end, which has a spherical surface and a tapered surface, and a support that supports the distal end. The plate section is provided with a hole for positioning the protrusion when the support is inserted thereto. The movable section faces a side of the hole where the tapered surface of the distal end exists, and moves along the plate section by being pressed by the tapered surface of the distal end as the distal end is inserted through the hole.

5 Claims, 7 Drawing Sheets

CONNECTION MECHANISM AND IMAGE FORMING APPARATUS

CROSS-REFERENCE TO RELATED APPLICATIONS

This application is based on and claims priority under 35 USC 119 from Japanese Patent Application No. 2013-210370 filed Oct. 7, 2013.

BACKGROUND

Technical Field

The present invention relates to connection mechanisms and image forming apparatuses.

SUMMARY

According to an aspect of the invention, there is provided a connection mechanism including a protrusion, a plate section, and a movable section. The protrusion has a distal end, which has a spherical surface and a tapered surface, and a support that supports the distal end. The plate section is provided with a hole for positioning the protrusion when the support is inserted thereto. The movable section faces a side of the hole where the tapered surface of the distal end exists, and moves along the plate section by being pressed by the tapered surface of the distal end as the distal end is inserted through the hole.

BRIEF DESCRIPTION OF THE DRAWINGS

Exemplary embodiments of the present invention will be described in detail based on the following figures, wherein.

DETAILED DESCRIPTION

Exemplary Embodiment

An exemplary embodiment will be described below with reference to FIG. 1. First, the overall configuration and the operation of an image forming apparatus 10 will be described, and then the configuration and the operation of a connection mechanism 100, which is a relevant part of this exemplary embodiment, will be described. In the following description, a direction indicated by an arrow Y in FIG. 1 will be defined as an apparatus height direction, and a direction indicated by an arrow X in FIG. 1 will be defined as an apparatus width direction. Furthermore, a direction (indicated by an arrow Z) that is orthogonal to the apparatus height direction and the apparatus width direction will be defined as an apparatus depth direction.

Configuration of Image Forming Apparatus

Overall Configuration

Figure 1:
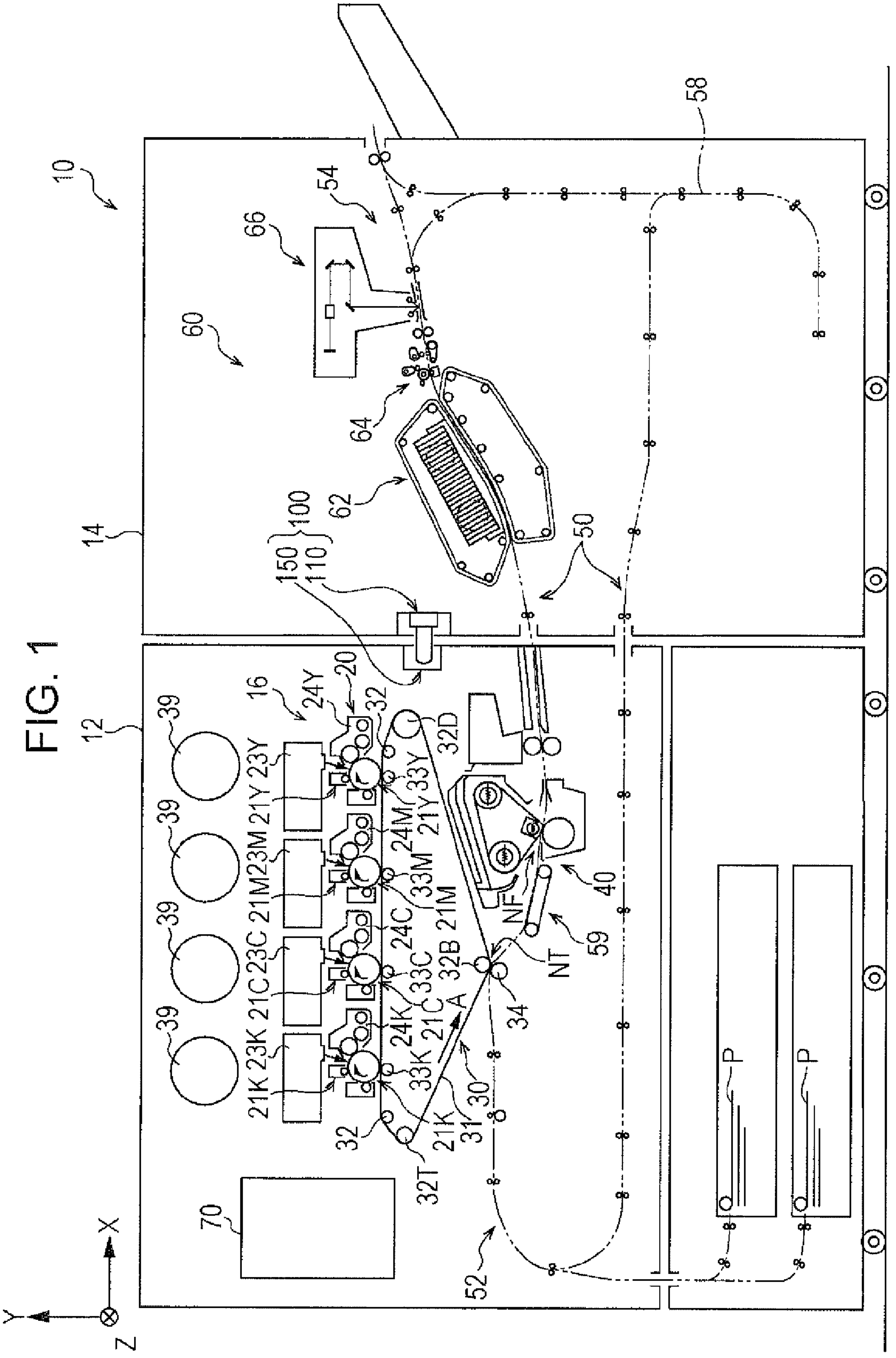
FIG. 1 schematically illustrates the overall configuration of an image forming apparatus according to an exemplary embodiment.

FIG. 1 schematically illustrates the overall configuration of the image forming apparatus 10 according to this exemplary embodiment when viewed from the front side thereof. As shown in FIG. 1, the image forming apparatus 10 includes a first housing 12, a second housing 14, an image forming section 16, a medium transport section 50, a post-processing section 60, and a controller 70. The controller 70 is configured to control the sections constituting the image forming apparatus 10 (such as sections constituting the image forming section 16).

Figure 2:
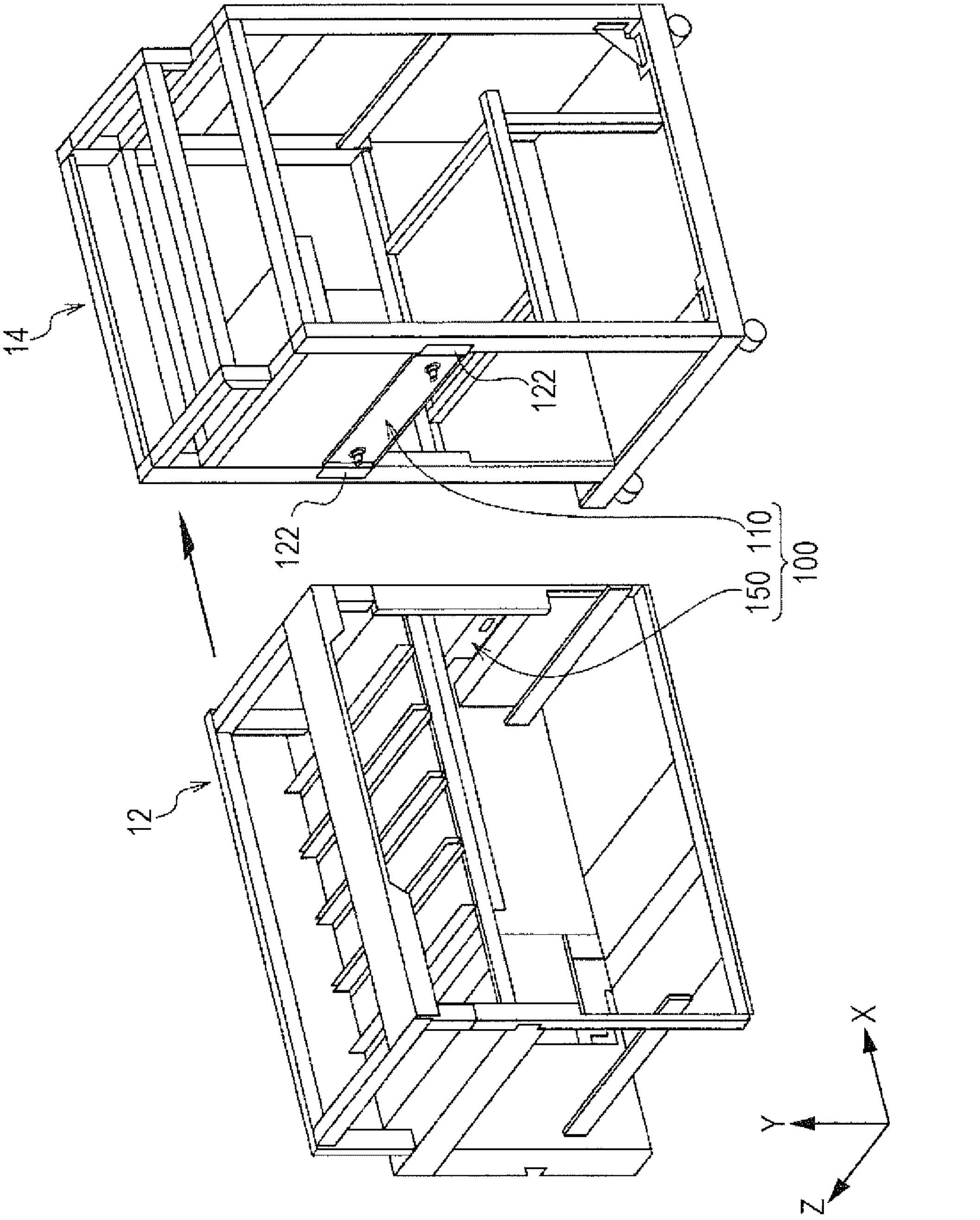
FIG. 2 is a perspective view illustrating a state where a first housing and a second housing of the image forming apparatus according to the exemplary embodiment are separated from each other.
Figure 3:
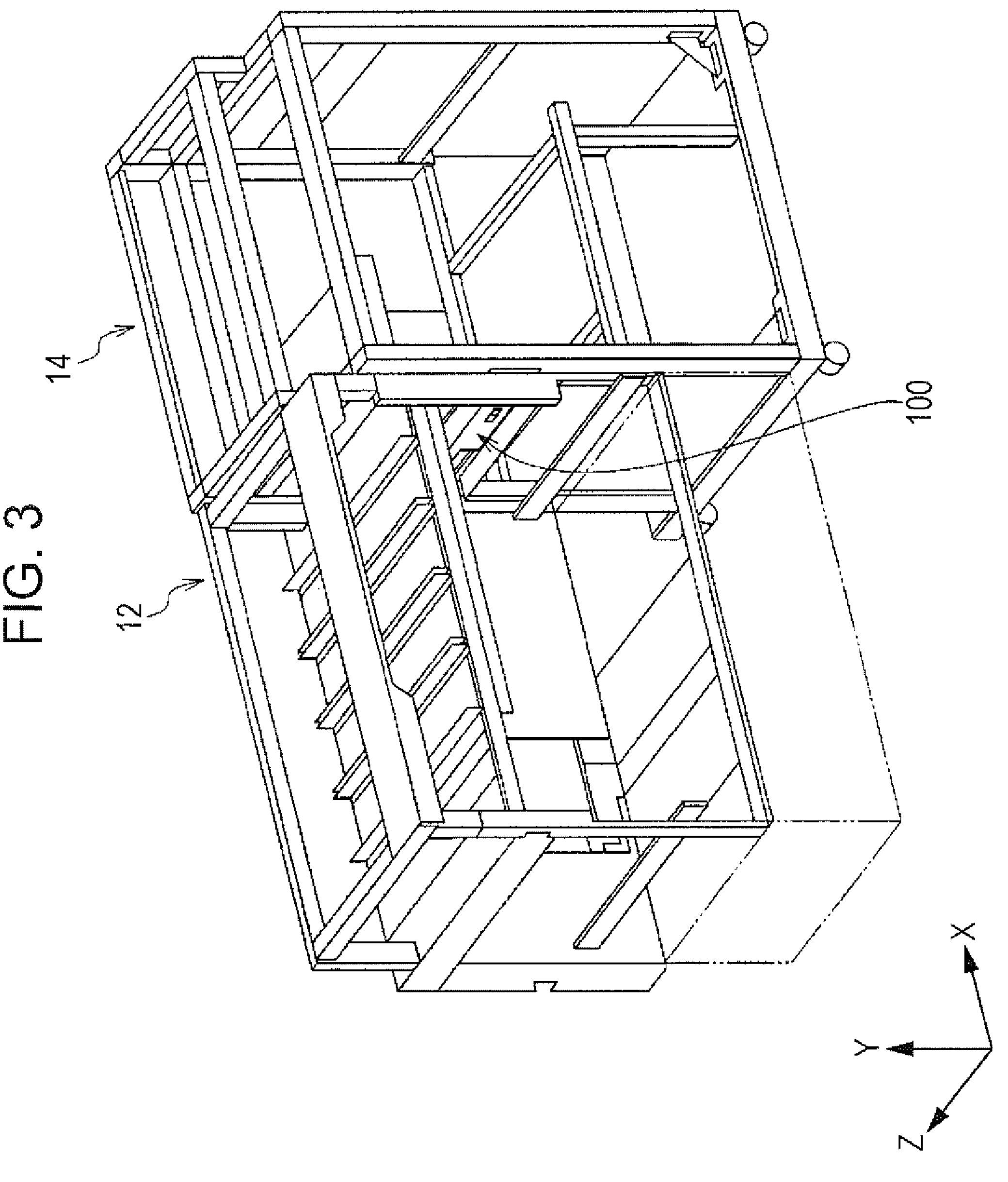
FIG. 3 is a perspective view illustrating a state where the first housing and the second housing of the image forming apparatus according to the exemplary embodiment are connected to each other by a connection mechanism.

The first housing 12 and the second housing 14 are connected to each other by the connection mechanism 100 (see FIGS. 1, 2, and 3). Since the connection mechanism 100 is a relevant part of this exemplary embodiment, a description thereof will be provided later.

Image Forming Section

The image forming section 16 includes toner image forming units 20 that form toner images, a transfer device 30 that transfers the images formed by the toner image forming units 20 onto a recording medium P, and a fixing device 40 that fixes the toner images transferred on the recording medium P onto the recording medium P. The image forming section 16 is configured to form an image onto a recording medium P by electrophotography. The image forming section 16 is provided in the first housing 12.

Toner Image Forming Units

Each toner image forming unit 20 includes a photoconductor drum 21, a charging unit 22, an exposure device 23, and a developing device 24. Multiple toner image forming units 20 are provided for forming toner images of respective colors. In this exemplary embodiment, four toner image forming units 20 for yellow (Y), magenta (M), cyan (C), and black (K) colors are provided. The reference characters “Y”, “M”, “C”, and “K” shown in FIG. 1 denote the respective colors mentioned above. The transfer device 30 is configured to transfer the four-color toner images onto the recording medium P at a transfer nip NT from a transfer belt 31 having the four-color toner images superimposed and first-transferred thereon.

Photoconductor Drums

Each photoconductor drum 21 is cylindrical and is rotationally driven about its own axis by a driver (not shown). The outer peripheral surface of the photoconductor drum 21 is provided with, for example, a photosensitive layer with negative charge polarity. Alternatively, the outer peripheral surface of the photoconductor drum 21 may be provided with an overcoat layer. The photoconductor drums 21 for the respective colors are linearly-arranged in the apparatus width direction when viewed from the front side.

Charging Units

Each charging unit 22 is configured to electrostatically charge the outer peripheral surface (i.e., the photosensitive layer) of the corresponding photoconductor drum 21 to negative polarity. In this exemplary embodiment, each charging unit 22 is a scorotron charging unit of a corona discharge type (non-contact charging type).

Exposure Devices

Each exposure device 23 is configured to form an electrostatic latent image on the outer peripheral surface of the corresponding photoconductor drum 21. In detail, in accordance with image data received from an image-signal processor that constitutes the controller 70, the outer peripheral surface of the photoconductor drum 21 electrostatically charged by the charging unit 22 is irradiated with modulated exposure light L. With the radiation of the exposure light L, an electrostatic latent image is formed on the outer peripheral surface of the photoconductor drum 21. In this exemplary embodiment, the exposure device 23 is configured to expose the outer peripheral surface of the photoconductor drum 21 to a light beam radiated from a light source (not shown) while scanning the light beam by using a light scanning unit (optical unit) including a polygonal mirror or an Fθ lens.

Developing Devices

Each developing device 24 develops the electrostatic latent image formed on the outer peripheral surface of the corresponding photoconductor drum 21 into a toner image by using a developer G containing a toner T and a carrier CA, so as to form the toner image on the outer peripheral surface of the photoconductor drum 21. The developing device 24 is connected to a toner cartridge 39, which is for supplying the toner T, via a supply path (not shown). The toner cartridges 39 for the respective colors are disposed above the photoconductor drums 21 and the exposure devices 23 and are arranged in the apparatus width direction when viewed from the front side. The toner cartridges 39 are individually replaceable.

Transfer Device

The transfer device 30 is configured to superimpose and first-transfer the toner images on the photoconductor drums 21 onto the transfer belt 31 and then second-transfer the superimposed toner image onto a recording medium P.

In detail, the transfer belt 31 is an endless belt whose shape is set by being wrapped around multiple rollers 32. In this exemplary embodiment, the transfer belt 31 has a shape of an inverted obtuse triangle that is long in the apparatus width direction when viewed from the front side. Of the multiple rollers 32, a roller 32D functions as a driving roller that receives driving force from a motor (not shown) so as to rotate the transfer belt 31 in a direction indicated by an arrow A. Furthermore, of the multiple rollers 32, a roller 32T functions as a tension applying roller that applies tension to the transfer belt 31. A roller 32B of the multiple rollers 32 functions as an opposed roller that is opposed to a second-transfer roller 34.

With regard to the transfer belt 31 having the aforementioned shape, the upper side thereof extending in the apparatus width direction is in contact with the photoconductor drums 21 from below. The images on the photoconductor drums 21 receive transfer bias voltage from first-transfer rollers 33 so as to become transferred onto the transfer belt 31. Furthermore, the second-transfer roller 34 is in contact with an obtuse lower apex of the transfer belt 31 so that the transfer nip NT is formed. The transfer belt 31 receives transfer bias voltage from the second-transfer roller 34 so as to transfer the toner images onto a recording medium P passing through the transfer nip NT.

Fixing Device

The fixing device 40 is configured to fix the toner images onto the recording medium P having the toner images transferred thereon at the transfer device 30. In this exemplary embodiment, the fixing device 40 heats and presses the toner images at a fixation nip NF so as to fix the toner images onto the recording medium P.

Medium Transport Section

The medium transport section 50 includes a medium feed portion 52 that feeds a recording medium P toward the image forming section 16 and a medium discharge portion 54 that discharges the recording medium P having an image formed thereon. The medium transport section 50 also includes a medium returning portion 58 to be used when forming images onto both faces of the recording medium P and an intermediate transport portion 59 that transports the recording medium P from the transfer device 30 to the fixing device 40.

The medium feed portion 52 is configured to feed recording media P to the transfer nip NT of the image forming section 16 in a one-by-one manner in accordance with a transfer timing. The medium discharge portion 54 is configured to discharge a recording medium P, having a toner image fixed thereon at the fixing device 40, outside the apparatus. With regard to the medium returning portion 58, when the recording medium P having the toner image fixed on one face thereof is to undergo an image forming process on the other face thereof, the medium returning portion 58 inverts the recording medium P and returns the recording medium P to the image forming section 16 (i.e., the medium feed portion 52). In other words, the recording medium P is transported from the first housing 12 toward the second housing 14. Moreover, the recording medium P is also transported from the second housing 14 toward the first housing 12.

Post-Processing Section

The post-processing section 60 includes a medium cooling portion 62, a correcting device 64, an image inspecting portion 66, and a part of the medium transport section 50 (such as the medium discharge portion 54 and the medium returning portion 58). The portions constituting the post-processing section 60 are disposed within the medium discharge portion 54 of the medium transport section 50.

Medium Cooling Portion, Correcting Device, and Image Inspecting Portion

The medium cooling portion 62 is configured to cool a recording medium P having an image formed thereon at the image forming section 16. The correcting device 64 is configured to correct bending of the recording medium P. The image inspecting portion 66 is configured to inspect the image formed on the recording medium P.

The medium cooling portion 62, the correcting device 64, and the image inspecting portion 66 constituting the post-processing section 60 are arranged in the medium discharge portion 54 in this order from the upstream side in the discharge direction of the recording medium P, and are configured to perform post-processing on the recording medium P that is being discharged by the medium discharge portion 54.

Image Forming Operation

An image forming process and post-processing performed on a recording medium P by the image forming apparatus 10 will now be described.

The controller 70 that has received an image formation command actuates the toner image forming units 20, the transfer device 30, and the fixing device 40. Thus, the photoconductor drums 21 and developing rollers (not given reference characters) are rotated, thus causing the transfer belt 31 to rotate. Moreover, a pressing roller 42 is rotated so as to cause a fixation belt (not given a reference character) to rotate. Furthermore, in synchronization with these operations, the controller 70 actuates, for example, the medium transport section 50.

The photoconductor drums 21 for the respective colors are electrostatically charged by the charging units 22 while being rotated. The controller 70 transmits image data processed at the image-signal processor to the exposure devices 23. The exposure devices 23 emit exposure light L according to the image data so as to expose the electrostatically-charged photoconductor drums 21 to the exposure light L. Thus, electrostatic latent images are formed on the outer peripheral surfaces of the photoconductor drums 21. The electrostatic latent images formed on the photoconductor drums 21 are developed into toner images by using the developers G supplied from the developing devices 24. Thus, of yellow (Y), magenta (M), cyan (C), and black (K) toner images, the toner image of the corresponding color is formed on each photoconductor drum 21.

The toner images formed on the photoconductor drums 21 are sequentially transferred onto the rotating transfer belt 31 due to transfer bias voltage applied thereto via the corresponding first-transfer rollers 33. Thus, a toner image constituted of superimposed four-color toner images is formed on the transfer belt 31. This toner image is transported to the transfer nip NT by the rotating transfer belt 31. The medium feed portion 52 feeds a recording medium P to this transfer nip NT in accordance with the transport timing of this toner image. Transfer bias voltage is applied to this transfer nip NT so that the toner image is transferred from the transfer belt 31 to the recording medium P.

The recording medium P having the toner image transferred thereon is vacuumed and transported from the transfer nip NT of the transfer device 30 toward the fixation nip NF of the fixing device 40 by the intermediate transport portion 59. The fixing device 40 applies heat and pressure (i.e., fixation energy) to the recording medium P passing through the fixation nip NF. Thus, the toner image transferred on the recording medium P becomes fixed onto the recording medium P.

The recording medium P discharged from the fixing device 40 is transported by the medium discharge portion 54 toward a discharged-medium receiver outside the apparatus while undergoing processing performed by the post-processing section 60. The recording medium P heated as a result of the fixing process is first cooled at the medium cooling portion 62. Then, the recording medium P undergoes a bending correction process performed by the correcting device 64. Furthermore, the image inspecting portion 66 detects the existence of or the degree of, for example, toner density defects, image defects, or image position defects in the toner image fixed on the recording medium P. The recording medium P is then discharged to the medium discharge portion 54.

In a case where an image is to be formed on a non-image face, which does not have an image formed thereon, of the recording medium P (i.e., in the case of duplex printing), the controller 70 switches the transport path of the recording medium P, after passing through the image inspecting portion 66, from the medium discharge portion 54 to the medium returning portion 58. Thus, the recording medium P is inverted and is transported to the medium feed portion 52. The back face of the recording medium P undergoes an image forming (fixing) process similar to the above-described image forming process performed on the front face thereof. The recording medium P then undergoes processing similar to the above-described post-processing performed on the front face after the image forming process and is discharged outside the apparatus by the medium discharge portion 54.

Configuration of Relevant Part

Overall Configuration

Figure 4:
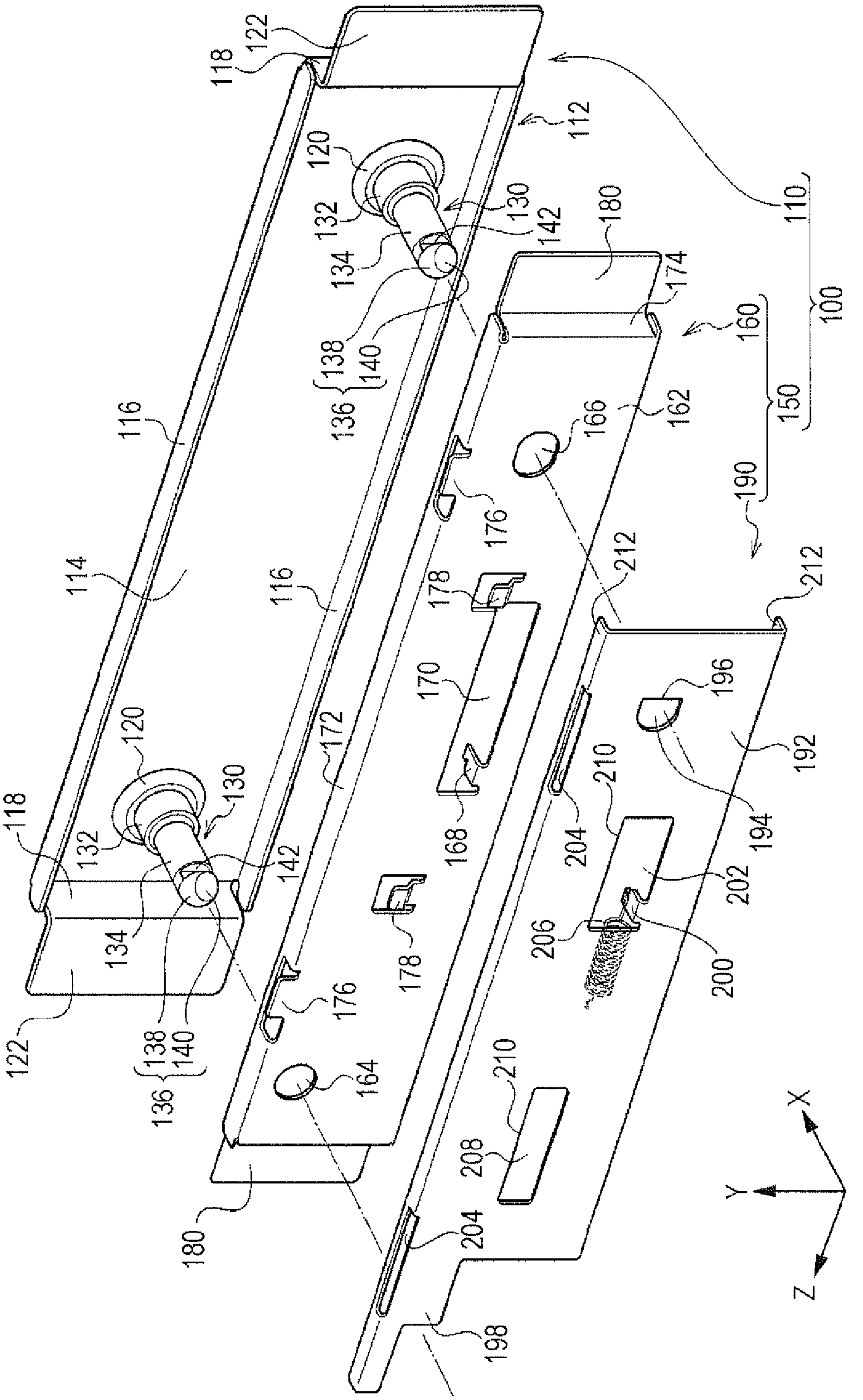
FIG. 4 is an exploded perspective view of the connection mechanism according to the exemplary embodiment.

Next, the connection mechanism 100, which is a relevant part of this exemplary embodiment, will be described with reference to the drawings. As shown in FIG. 4, the connection mechanism 100 includes a first connection unit 110 and a second connection unit 150. The first connection unit 110 is fixed to the second housing 14, and the second connection unit 150 is fixed to the first housing 12 (see FIGS. 1, 2, and 3).

First Connection Unit

The first connection unit 110 will be described below with reference to FIGS. 4 and 6A.

As shown in FIG. 4, the first connection unit 110 includes two docking pins 130 and a fixation plate 112. The docking pins 130 are an example of protrusions.

Docking Pins

In the following order from the right side (i.e., the second housing 14 side) in the apparatus width direction, each of the docking pins 130 includes a columnar base 132, a columnar support 134 with a radius R smaller than the radius of the base 132, and a distal end 136. The base 132 has a press-fitting portion 132A at the right side thereof in the apparatus width direction. A dotted chain line in FIG. 6A denotes an axis F of the columnar support 134.

The support 134 of the first connection unit 110 is provided with a recess 142 located near the distal end 136 in the apparatus width direction. Specifically, the recess 142 is formed at the near side of the support 134 in the apparatus depth direction and has a surface extending in the apparatus height direction. The recess 142 opens vertically in the apparatus height direction.

Figures 6A, 6B, 6C:
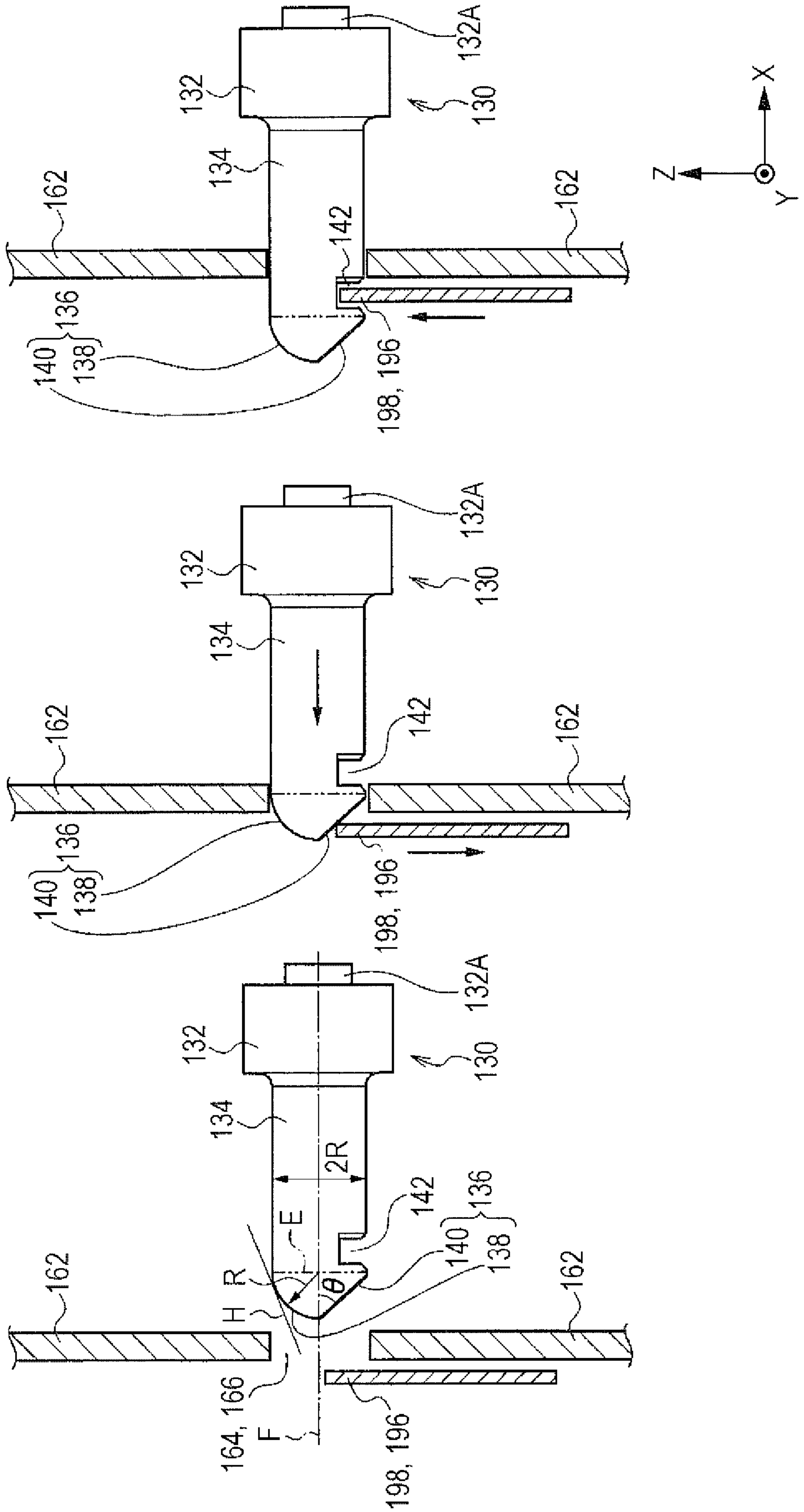
FIGS. 6A to 6C schematically illustrate the connection mechanism in FIG. 5, FIG. 6A schematically illustrating a state before a connecting process, FIG. 6B schematically illustrating the connecting process, and FIG. 6C schematically illustrating a state after the connecting process.

As shown in FIG. 6A, the distal end 136 has a spherical surface 138 and a tapered surface 140. The spherical surface 138 is a part of a sphere having a radius R centered on a point where a boundary surface E between the support 134 and the distal end 136 intersects with the axis F of the support 134. The boundary surface E is an imaginary plane located at the boundary between the support 134 and the distal end 136. When the cross section of the docking pin 130 is viewed from the left side (i.e., from the first housing 12) in the apparatus width direction, the cross-sectional shape of the imaginary plane is a circle having the radius R. When viewed from the apparatus height direction, the tapered surface 140 is located at the near side of the support 134 in the apparatus depth direction relative to the axis thereof, and is a flat surface that is inclined by an angle θ relative to the axis of the support 134. The edge of the tapered surface 140 has been chamfered. The outer peripheral surface of the distal end 136 is constituted of the spherical surface 138, the tapered surface 140, and the edge of the tapered surface 140.

A tangent line H at a side of the distal end 136 opposite the side thereof where the tapered surface 140 is formed is aligned with a side surface of the support 134 at the boundary (i.e., outer peripheral area of the boundary surface E) between the support 134 and the distal end 136.

Fixation Plate

As shown in FIG. 4, the fixation plate 112 of the first connection unit 110 is provided with a fixation-plate body 114, two ribs 116, two ribs 118, two pin fixation sections 120, and two flanges 122.

The fixation-plate body 114 is a long plate. The fixation-plate body 114 is fixed to the second housing 14 such that the lengthwise direction thereof is parallel to the apparatus depth direction (see FIG. 2).

The opposite ends of the fixation-plate body 114 in the lengthwise direction are provided with the pin fixation sections 120 for fixing the docking pins 130 thereto. The press-fitting portions 132A of the docking pins 130 are press-fitted into holes (not shown) in the pin fixation sections 120 so that the docking pins 130 are fixed in position.

The ribs 116 are formed along the opposite ends of the fixation-plate body 114 in the widthwise direction. Furthermore, the ribs 118 are formed along the opposite ends of the fixation-plate body 114 in the lengthwise direction. The ribs

116 and 118 are oriented toward the side where the docking pins 130 are fixed to the fixation-plate body 114.

Furthermore, the flanges 122 extend away from each other from the ends of the ribs 118 located at the opposite ends of the fixation-plate body 114 in the lengthwise direction. The flanges 122 are fixed to the second housing 14 (see FIG. 2). The flanges 122 are provided with positioning pins and screw through-holes (both not shown) and are fixed to predetermined positions of the second housing 14.

Second Connection Unit

The second connection unit 150 will be described below with reference to FIG. 4.

The second connection unit 150 includes a positioning plate 160, a slide lock section 190, a tension spring 206, and a lock releasing section 220. The positioning plate 160 is an example of a plate section. The slide lock section 190 is an example of a movable section.

Positioning Plate

The positioning plate 160 includes a positioning-plate body 162, two ribs 172, two ribs 174, and two flanges 180.

The positioning-plate body 162 is a long plate. The positioning-plate body 162 is fixed to the first housing 12 such that the lengthwise direction thereof is parallel to the apparatus depth direction (see FIGS. 2 and 3).

The opposite ends of the positioning-plate body 162 in the lengthwise direction are provided with two holes (i.e., a hole 164 and an elongated hole 166) through which the two docking pins 130 of the first connection unit 110 are respectively inserted. The hole 164 is formed at the far side of the positioning-plate body 162 in the apparatus depth direction and is capable of receiving the support 134 of the corresponding docking pin 130 in the insertion direction thereof so as to position the docking pin 130 in the apparatus depth direction and the apparatus height direction. The elongated hole 166 is formed at the near side of the positioning-plate body 162 in the apparatus depth direction and is capable of receiving the support 134 of the corresponding docking pin 130 in the insertion direction thereof so as to position the docking pin 130 in the apparatus height direction. Two dotted chain lines in FIG. 4 denote the insertion directions of the docking pins 130 relative to the hole 164 and the elongated hole 166 in the positioning plate 160.

An upper edge of the positioning-plate body 162 in the apparatus height direction is provided with two projections 176 extending upward in the apparatus height direction from opposite ends in the apparatus depth direction. Furthermore, two flat portions 178 extending along the positioning-plate body 162 are formed in an area between the two projections 176 (the hole 164 and the elongated hole 166) at the opposite surface of the positioning-plate body 162 from the side from which the docking pins 130 are inserted. One surface of each flat portion 178 is separated from the positioning-plate body 162 along the aforementioned opposite surface thereof. Furthermore, the positioning-plate body 162 is provided with an elongated hole 170 extending in the lengthwise direction of the positioning-plate body 162 and formed between the two flat portions 178. A part of the edge of the elongated hole 170 is provided with a spring hook portion 168 that is oriented toward the side from which the docking pins 130 are inserted and onto which the far end of the tension spring 206 in the apparatus depth direction is hooked.

The opposite ends of the positioning-plate body 162 in the widthwise direction are provided with the ribs 172. The opposite ends of the positioning-plate body 162 in the lengthwise direction are provided with the ribs 174. The ribs 172 and 174 are oriented toward the side from which the docking pins 130 are inserted into the positioning-plate body 162.

Furthermore, the flanges 180 extend away from each other from the ends of the ribs 174 located at the opposite ends of the positioning-plate body 162 in the lengthwise direction. The flanges 180 are fixed to the first housing (see FIGS. 2 and 3). The flanges 180 are provided with positioning pins and screw through-holes (both not shown) and are fixed to predetermined positions of the first housing 12.

Slide Lock Section

The slide lock section 190 of the second connection unit 150 includes a slide-lock-section body 192 and ribs 212.

The slide-lock-section body 192 is a long plate. The slide-lock-section body 192 is attached to the positioning plate 160 fixed to the first housing 12 such that the lengthwise direction of the slide-lock-section body 192 is parallel to the apparatus depth direction (see FIG. 5).

A hole 194 is formed at the near side of the slide-lock-section body 192 in the apparatus depth direction. The hole 194 receives the distal end 136 of the docking pin 130 located at the near side in the apparatus depth direction after the docking pin 130 is inserted through the elongated hole 166 of the positioning plate 160. With regard to the hole 194, an edge thereof at the near side in the apparatus depth direction extends linearly in the apparatus height direction, whereas an edge thereof at the far side in the apparatus depth direction is circular-arc-shaped. In the slide-lock-section body 192, an area forming the aforementioned linear edge and located at the near side in the apparatus depth direction serves as a first lock portion 196 that engages with the recess 142.

A second lock portion 198, which is flat, is provided at the far side of the slide-lock-section body 192 in the apparatus depth direction and at the upper side thereof in the apparatus height direction.

The slide-lock-section body 192 (i.e., the slide lock section 190) is supported by the positioning plate 160 in a slidable manner in the apparatus depth direction. This will be described in detail later. The slide lock section 190 is attached to the positioning plate 160 while being constantly pulled in the apparatus depth direction by the tension spring 206 (see FIG. 5).

When the distal end 136 of the docking pin 130 located at the near side in the apparatus depth direction passes through the elongated hole 166 of the positioning plate 160 so that the recess 142 of the support 134 faces the first lock portion 196, the first lock portion 196 moves within the recess 142. Then, the first lock portion 196 moving within the recess 142 locks the docking pin 130, located at the near side in the apparatus depth direction, in the insertion direction thereof (see FIG. 6C).

Furthermore, when the distal end 136 of the docking pin 130 located at the far side in the apparatus depth direction passes through the hole 164 of the positioning plate 160 so that the recess 142 of the support 134 faces the second lock portion 198, the second lock portion 198 moves within the recess 142. Then, the second lock portion 198 moving within the recess 142 locks the docking pin 130, located at the far side in the apparatus depth direction, in the insertion direction thereof (see FIG. 6C).

The slide lock section 190 is provided with an elongated hole 208 extending in the lengthwise direction of the slide lock section 190 in an area between the first lock portion 196 (i.e., the hole 194) and the second lock portion 198. Furthermore, the slide lock section 190 is provided with an elongated hole 202 extending in the lengthwise direction of the slide lock section 190 in an area between the first lock portion 196 (i.e., the hole 194) and the elongated hole 208. A part of the edge of the elongated hole 202 is provided with a spring hook portion 200 that is oriented toward the side from which the distal ends 136 of the docking pins 130 are inserted and onto which the near end of the tension spring 206 in the apparatus depth direction is hooked.

The opposite ends of the slide-lock-section body 192 in the apparatus height direction are provided with the ribs 212. The ribs 212 are oriented toward the side from which the distal ends 136 of the docking pins 130 are inserted into the slide-lock-section body 192.

With regard to the slide-lock-section body 192 and the upper rib 212 in the apparatus height direction, opposite ends thereof in the apparatus depth direction are provided with elongated rectangular holes 204 that extend astride the slide-lock-section body 192 and the upper rib 212.

Relationship Between Positioning Plate and Slide Lock Section

Although the configurations of the positioning plate 160 and the slide lock section 190 are separately described above, the following description relates to the relationship between the positioning plate 160 and the slide lock section 190 in an attached state.

Figure 5:
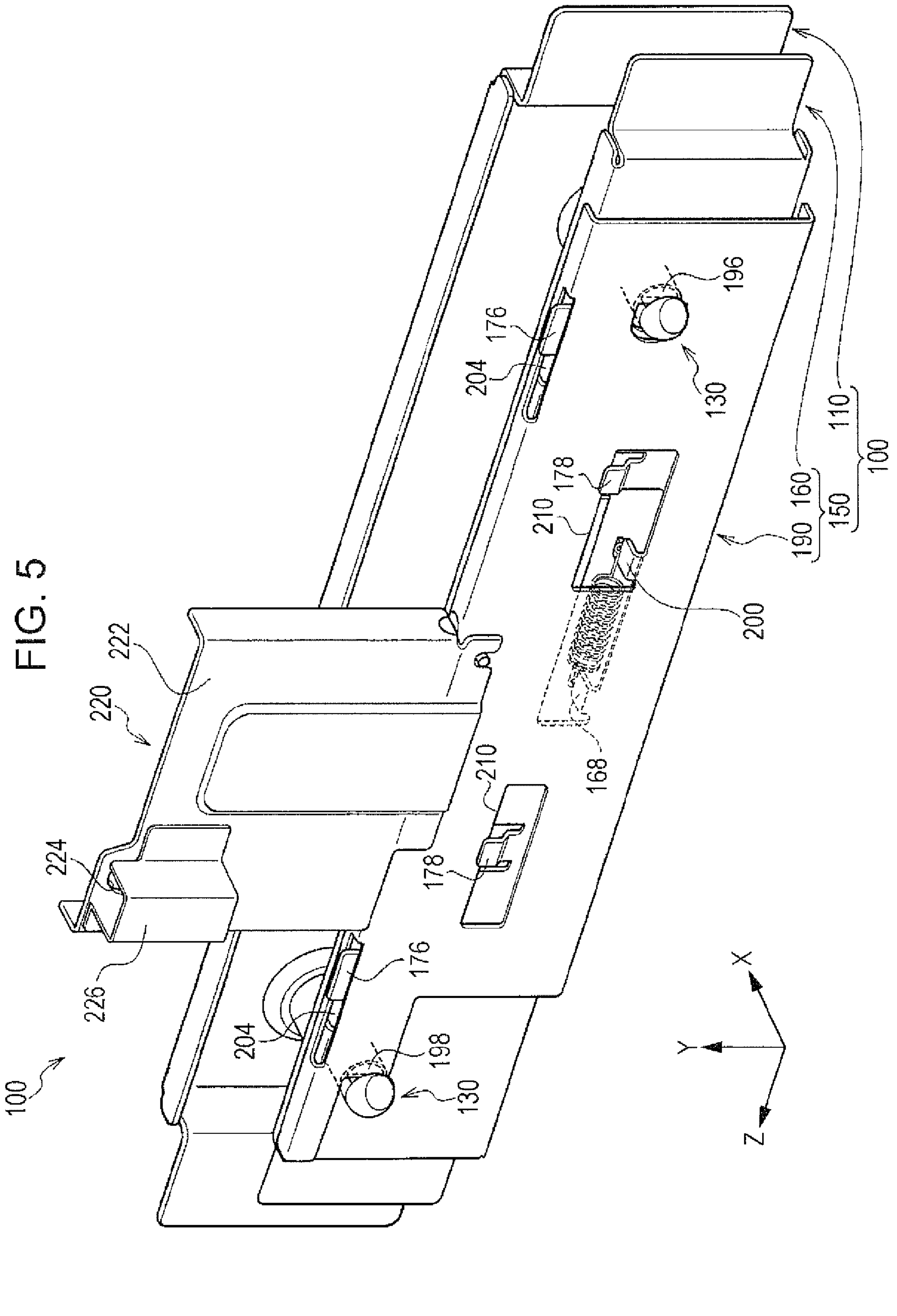
FIG. 5 is a perspective view illustrating a state where the connection mechanism and a releasing section according to the exemplary embodiment are connected to each other.

FIG. 5 illustrates a state where the first connection unit 110 and the second connection unit 150 constituting the connection mechanism 100 are connected to each other. In FIG. 5, the slide lock section 190 attached to the positioning plate 160 is pulled toward the far side in the apparatus depth direction by the tension spring 206 relative to the positioning plate 160. In this state, the first lock portion 196 and the second lock portion 198 are inserted in the recesses 142 of the docking pins 130 so that the docking pins 130 are locked in the insertion direction. Furthermore, the tension spring 206 hooked to the spring hook portion 168 of the positioning plate 160 and to the spring hook portion 200 of the spring hook portion 200 has a length that is longer than its natural length.

The lower surface of the upper rib 212, in the apparatus height direction, of the slide lock section 190 is attached to the upper surface of the upper rib 172, in the apparatus height direction, of the positioning plate 160 in an overlying manner. The two projections 176 formed in the positioning plate 160 are inserted into the two rectangular holes 204 in the slide lock section 190. In the apparatus depth direction, the width of each projection 176 is smaller than the width of each rectangular hole 204.

Upper areas 210, in the apparatus height direction, of the holes 202 and 208 in the slide lock section 190 are set in gaps between the positioning-plate body 162 and the flat portions 178 formed in the positioning-plate body 162. The slide lock section 190 is positioned in the apparatus width direction by being set in these gaps. In the apparatus depth direction, the width of each flat portion 178 is smaller than the width of each of the holes 202 and 208 (i.e., the areas 210).

Accordingly, the slide lock section 190 is slidable within a predetermined movable range in the apparatus depth direction relative to the positioning plate 160.

The limit for the movable range of the slide lock section 190 for the far side in the apparatus depth direction corresponds to a position where the flat portion 178 located at the near side in the apparatus depth direction abuts on the near edge of the hole 202 in the apparatus depth direction. This position corresponds to a state where the docking pins 130 are not inserted. In this case, as shown in FIG. 6A, with regard to the first lock portion 196 of the slide lock section 190, the far end of the first lock portion 196 in the apparatus depth direction is positioned above the tapered surface 140 when viewed in the apparatus width direction. In other words, when viewed from the apparatus width direction, the slide lock section 190 (i.e., the first lock portion 196) is provided so as to face the tapered surface 140 at the distal end 136 of each docking pin 130 (see FIG. 6A). The same applies to the case of the second lock portion 198.

The limit for the movable range of the slide lock section 190 for the near side in the apparatus depth direction corresponds to a position where the projections 176 abut on the far edges, in the apparatus depth direction, of the rectangular holes 204 formed in the slide lock section 190.

Lock Releasing Section

Next, the lock releasing section 220 will be described with reference to FIG. 5. The lock releasing section 220 is to be used for releasing the connected state between the first housing 12 and the second housing 14 after the first housing 12 and the second housing 14 are connected to each other by the connection mechanism 100.

The lock releasing section 220 is fixed in a state where it protrudes upward in the apparatus height direction from the slide lock section 190 of the second connection unit 150. The lock releasing section 220 includes a lock-releasing-section body 222 and a cover 226. An area in the lock-releasing-section body 222 that protrudes from the slide lock section 190 is provided with an elongated hole 224 extending in the apparatus height direction. The cover 226 is U-shaped. The cover 226 is attached to the lock-releasing-section body 222 such that, when viewed from the apparatus width direction, the U-shaped area faces the second housing 14 and overlies the elongated hole 224.

The second housing 14 is provided with a manipulation hole (not shown). When the connected state between the first housing 12 and the second housing 14 is to be released, a rod-shaped hook member (not shown) inserted through the manipulation hole is hooked onto the elongated hole 224 formed in the lock releasing section 220. Then, in the state where the hook member is hooked to the elongated hole 224, the rod-shaped hook member is pulled toward the near side in the apparatus depth direction, whereby the locked state by the first lock portion 196 and the second lock portion 198 is released. Subsequently, the second housing 14 is moved in the apparatus width direction relative to the first housing 12 so that the connected state by the connection mechanism 100 is released. The cover 226 is provided for preventing an end of the aforementioned hook member from coming into contact with the image forming section 16 provided in the first housing 12 when the hook member is hooked onto the elongated hole 224.

Operation

The operation according to this exemplary embodiment will be described below. When the components used in the exemplary embodiment are to be used in comparative examples (i.e., first to fourth comparative examples) below, the reference characters of the components will be directly used for those in the comparative examples.

First Comparative Example

Figure 7:
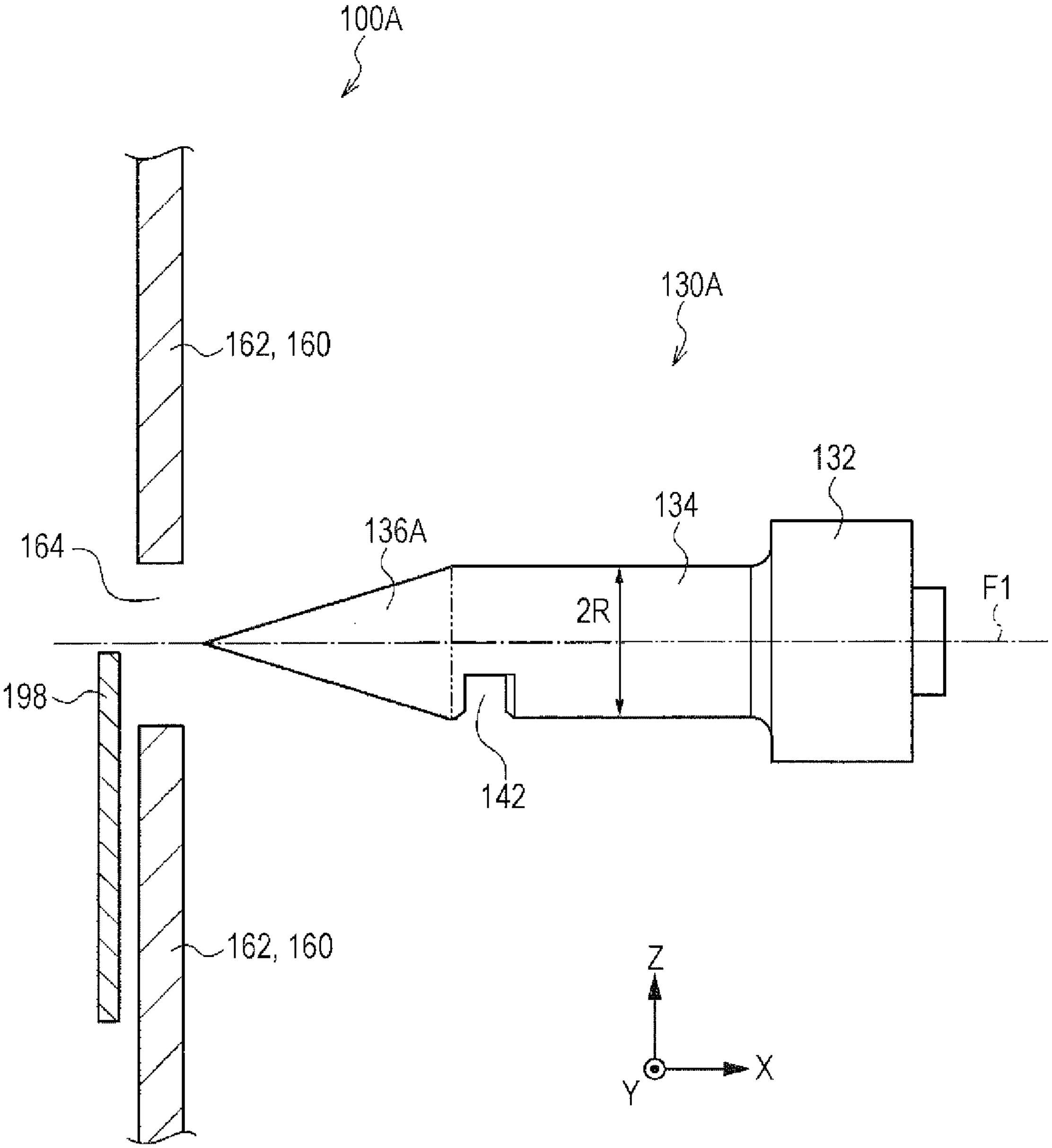
FIG. 7 schematically illustrates a part of a connection mechanism according to a comparative example.

A first comparative example shown in FIG. 7 will now be discussed as a comparative example with respect to the connection mechanism 100 according to this exemplary embodiment. A connection mechanism 100A according to the first comparative example differs from the connection mechanism 100 according to the exemplary embodiment in that the docking pins 130 are replaced by docking pins 130A. Specifically, a distal end 136A of each docking pin 130A has a conical shape. A dotted chain line in FIG. 7 denotes a center line F1 of the columnar support 134. In FIG. 7, the center of the hole 164 is aligned with the center line F1.

In the first comparative example, in a case where the docking pins 130A (i.e., the first connection unit 110) are to be connected to the second connection unit 150, even when the docking pins 130A are pressed in the insertion direction in a state where the axis of one of the docking pins 130A is displaced by a distance R in the apparatus depth direction relative to the center of the hole 164, the other docking pin 130A would be inserted into the hole 166 in the positioning plate 160. In other words, since each distal end 136A has a conical shape, the distal end 136A would partly engage with the hole 166 so long as the peripheral area of the distal end 136A is inserted through the edge of the hole 166. Then, when the distal end 136A partly engaged with the hole 166 receives a force acting in the insertion direction, a portion of the force is converted into a moving force acting in a direction for eliminating the displacement, causing the distal end 136A to be inserted into the hole 166. This may sometimes cause the peripheral area around the edge of the hole 166 to become deformed by being pressed by the distal end 136A. Furthermore, when the tip of the distal end 136A abuts onto the second lock portion 198 of the slide lock section 190, the second lock portion 198 may become deformed by being pressed. Once a part of the second connection unit 150 becomes deformed in this manner, reconnection between the docking pins 130A and the second connection unit 150 may become difficult, or even if the docking pins 130A are successfully connected to the second connection unit 150, the first housing 12 and the second housing 14 may possibly become connected in a displaced state.

Next, the connection mechanism 100 according to this exemplary embodiment will be described. In this exemplary embodiment, if the docking pins 130 are pressed in the insertion direction in a state where the axis of one of the docking pins 130 is displaced by a distance R in the apparatus depth direction relative to the center of the hole 164, there is a lower possibility that the other docking pin 130 may become inserted into the hole 166, as compared with the first comparative example. This is due to the following reason. Since the distal ends 136 of the docking pins 130 have spherical surfaces and the tangent line at each distal end 136 extends along the positioning plate 160, the moving force acting in the direction for eliminating the displacement is smaller than that in the first comparative example.

Therefore, with the connection mechanism 100 according to this exemplary embodiment, deformation of the edge of the hole caused by inserting the protrusion from a position displaced from the center of the plate section may be suppressed in the connection mechanism 100, as compared with the first comparative example.

Furthermore, with the image forming apparatus 10 connected via the connection mechanism 100 according to this exemplary embodiment, defective transport of a recording medium P caused by a defective connection of the connection mechanism 100 may be suppressed, as compared with an image forming apparatus connected via the connection mechanism 100A according to the first comparative example.

Second Comparative Example

Next, a second comparative example (not shown) will be discussed as a comparative example with respect to the connection mechanism 100 according to this exemplary embodiment. A connection mechanism according to the second comparative example differs from the connection mechanism 100 according to the exemplary embodiment in that the spherical surface at the distal end of each docking pin 130 has a radius that is smaller than R. In other words, a step is formed at the boundary between the support and the distal end.

In the second comparative example, in a case where each docking pin is inserted in a state where the opposite side from the side provided with the tapered surface at the distal end thereof is partly engaged with the edge of the corresponding hole, since there is a step at the boundary between the support and the distal end, the step becomes hooked onto an area that forms the edge of the hole, possibly making it difficult to insert the support.

In contrast, with the connection mechanism 100 according to this exemplary embodiment, the tangent line H at the side of the distal end 136 opposite the side thereof where the tapered surface 140 is formed is aligned with the side surface of the support 134 at the boundary between the support 134 and the distal end 136. Therefore, there is no step at the boundary between the support 134 and the distal end 136. Moreover, in a case where the displacement of the axis of the docking pin 130 relative to the center of the hole 164 is small, even if the spherical surface 138 is inserted over the edge of the hole 166, the tangent line H at a contact point between the spherical surface 138 and the edge of the hole 166 gradually changes and is ultimately aligned with the side surface of the support 134.

Therefore, with the connection mechanism 100 according to this exemplary embodiment, the support 134 may be readily inserted into the hole 166, as compared with the second comparative example.

Third Comparative Example

Next, a third comparative example (not shown) will be discussed as a comparative example with respect to the connection mechanism 100 according to this exemplary embodiment. In a connection mechanism according to the third comparative example, the entire distal end of each docking pin is a part of a spherical surface (i.e., semispherical surface) having a radius R with the center of a boundary surface between the support and the distal end acting as the center of the sphere.

In the third comparative example, in a case where the docking pin is inserted into the hole 164 in the positioning plate 160 of the second connection unit 150 in the apparatus width direction, the spherical surface with the radius R abuts onto the second lock portion 198 of the slide lock section 190 facing a part of the hole 164. Since the second lock portion 198 faces the part of the hole 164 at a position closer to the center of the hole 164 than the edge thereof, the spherical surface at the distal end abuts onto an area with an angle close to 90° relative to the insertion direction of the docking pin.

In contrast, with the connection mechanism 100 according to this exemplary embodiment, the slide lock section 190 is provided at the side of the distal end 136 of each docking pin 130 where the tapered surface 140 is provided, when viewed from the apparatus width direction (see FIGS. 4, 5, and 6). Specifically, instead of the spherical surface 138 of the distal end 136, the tapered surface 140 with an angle θ relative to the insertion direction abuts onto the second lock portion 198 of the slide lock section 190. Therefore, in the connection mechanism 100 according to this exemplary embodiment, even when the docking pins 130 are pressed with a small pressing force, the second lock portion 198 is readily movable, as compared with the third comparative example.

Consequently, with the connection mechanism 100 according to this exemplary embodiment, the operating efficiency of the connecting operation of the connection mechanism 100 may be improved, as compared with the third comparative example.

Fourth Comparative Example

In the connection mechanism 100 according to this exemplary embodiment, after the first housing 12 and the second housing 14 are connected to each other, the connected state may sometimes be temporarily released when, for example, moving the installed image forming apparatus 10.

A fourth comparative example (not shown) will now be discussed as a comparative example with respect to the connection mechanism 100 according to this exemplary embodiment. In a connection mechanism according to the fourth comparative example, in a case where the locked state of the connection mechanism is to be released, a hook member is inserted through a manipulation hole provided in the first housing 12 and is hooked onto a hole provided in the slide lock section so as to release the locked state of the connection mechanism.

In the fourth comparative example, since the locked state of the connection mechanism is released by inserting the hook member from the first housing 12 side, the hook member comes into contact with the image forming section 16, possibly damaging the image forming section 16 (e.g., the transfer belt 31).

Next, the connection mechanism 100 according to this exemplary embodiment will be described. In the connection mechanism 100, when the locked state between the first housing 12 and the second housing 14 is to be released, the aforementioned hook member inserted toward the far side in the apparatus depth direction through the manipulation hole is hooked onto the elongated hole 224 formed in the lock releasing section 220. Then, when the hook member is pulled toward the near side in the apparatus depth direction in the state where the hook member is hooked to the elongated hole 224, the locked state by the first lock portion 196 and the second lock portion 198 becomes released. Subsequently, the second housing 14 is moved in the apparatus width direction relative to the first housing 12 so that the connected state by the connection mechanism 100 becomes released. Moreover, since the elongated hole 224 to which the aforementioned hook member is hooked is covered with the cover 226 (see FIG. 5), the end of the aforementioned hook member does not come into contact with the image forming section 16 (e.g., the transfer belt 31) provided in the first housing 12.

Therefore, with the connection mechanism 100 according to this exemplary embodiment, the image forming section 16 may be prevented from being damaged when releasing the locked state of the connection mechanism 100, as compared with the fourth comparative example.

Although a specific exemplary embodiment of the present invention has been described in detail above, the present invention is not limited to the above-described embodiment, and other various embodiments are permissible within the scope of the invention.

For example, although the image forming section 16 is described as being provided in the first housing 12 in the exemplary embodiment, the image forming section 16 may alternatively be provided in the second housing 14.

Furthermore, in the exemplary embodiment described above, the image forming section 16 provided in the first housing 12 includes the toner image forming units 20, the transfer device 30, and the fixing device 40. Alternatively, at least one of the above may be included in the image forming section 16. In other words, an image forming section excluding the fixing device 40 may be provided in the first housing 12, and the fixing device 40 may be provided in the second housing 14.

Furthermore, although each spherical surface is described as being a spherical surface with a radius R in the exemplary embodiment described above, the cross section of the spherical surface, including the axis of the docking pin, may be elliptical or a shape formed of other curve lines.

Furthermore, although each tapered surface is described as being a flat surface in the exemplary embodiment described above, the cross-sectional shape thereof may be, for example, an exponentially tapered shape or a parabolically tapered shape so long as the slide lock section 190 is made movable along the positioning plate 160.

Furthermore, although the connection mechanism 100 is described as being used for connecting the first housing 12 and the second housing 14 to each other in the exemplary embodiment, the connection mechanism 100 may alternatively be used for connecting a peripheral device of the image forming apparatus, such as a scanner or a finisher, to the image forming apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A connection mechanism comprising:

a first protrusion and a second protrusion, each protrusion having a distal end, the distal end having a spherical surface and a tapered surface, and each protrusion having a support that supports the distal end;

a plate section that is provided with a first hole and a second hole for positioning the first protrusion and the second protrusion, respectively, when the support of each of the first protrusion and the second protrusion is respectively inserted thereto, one of the first hole or the second hole being an elongated hole; and a movable section that faces a side of the first hole and the second hole, respectively, the side being where the tapered surface of the distal end exists, and the movable section moving along the plate section by being pressed by the tapered surface of the distal end of the first protrusion and the second protrusion, respectively, as the distal end of the first protrusion and the second protrusion is respectfully inserted through the first hole and the second hole.

2. The connection mechanism according to claim 1, wherein the support is columnar, and wherein a tangent line at a side of the distal end opposite a side thereof where the tapered surface is formed is aligned with a side surface of the support at a boundary between the support and the distal end.

3. An image forming apparatus comprising:

a first housing;

a second housing; and the connection mechanism according to claim 1 that connects the first housing and the second housing, wherein at least a portion of an image forming section is provided in one of the first housing and the second housing, and a recording medium is transported from the first housing toward the second housing.

4. The connection mechanism according to claim 1, wherein the first protrusion is disposed at a height that is different from a height at which the second protrusion is disposed.

5. The connection mechanism according to claim 1, wherein the size of the first hole is larger than the size of the second hole.

* * * * *